United States Patent
Zhou

(10) Patent No.: US 8,311,544 B2
(45) Date of Patent: Nov. 13, 2012

(54) DE-REGISTRATION METHOD, HOME NODEB (HNB), AND HOME NODEB GATEWAY (HNB GW)

(75) Inventor: Zheng Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/071,912

(22) Filed: Mar. 25, 2011

(65) Prior Publication Data

US 2011/0171963 A1 Jul. 14, 2011

Related U.S. Application Data

(63) Continuation of application No. PCT/CN2009/073037, filed on Jul. 31, 2009.

(30) Foreign Application Priority Data

Sep. 26, 2008 (CN) .......................... 2008 1 0216523

(51) Int. Cl.
H04Q 7/20 (2006.01)

(52) U.S. Cl. ......... 455/440; 455/436; 455/437; 455/438

(58) Field of Classification Search .......... 455/436–438, 455/440

See application file for complete search history.

(56) References Cited

U.S. PATENT DOCUMENTS

| 6,888,803 B1 * | 5/2005 | Gentry et al. ................ 370/259 |
| 2007/0287467 A1 * | 12/2007 | Oswal et al. ............... 455/452.2 |
| 2008/0076425 A1 | 3/2008 | Khetawat et al. |
| 2008/0084846 A1 * | 4/2008 | Watanabe et al. ............. 370/331 |
| 2008/0261602 A1 * | 10/2008 | Livneh .......................... 455/442 |
| 2009/0011795 A1 * | 1/2009 | Fukui et al. .................. 455/561 |
| 2009/0061876 A1 * | 3/2009 | Ho et al. ....................... 455/436 |
| 2009/0135783 A1 * | 5/2009 | Khalil et al. .................. 370/331 |
| 2009/0285186 A1 * | 11/2009 | Chin et al. .................... 370/335 |

FOREIGN PATENT DOCUMENTS

| CN | 1852196 A | 10/2006 |
| CN | 101163334 A | 4/2008 |
| KR | 20030013645 | 2/2003 |
| WO | 2008/100074 | 8/2008 |

OTHER PUBLICATIONS

Chinese Office Action with English Translation mailed Jul. 21, 2011 issued in corresponding Chinese Patent Application No. 200810216523.4.

Written Opinion of the International Searching Authority mailed Nov. 5, 2009 issued in corresponding International Patent Application No. PCT/CN2009/073037.

(Continued)

*Primary Examiner* — Charles Shedrick
(74) *Attorney, Agent, or Firm* — Staas & Halsey LLP

(57) ABSTRACT

The present invention relates to the field of communication technology, and a de-registration method, a Home NodeB (HNB) and a Home NodeB Gateway (HNB GW) are disclosed. In an embodiment, the present invention provides a de-registration method, comprising: initiating, by an HNB GW, release of pre-registration resources corresponding to user equipment (UE) after the HNB GW receives indication information indicating that the UE moves to another cell from a source HNB. Applying the embodiment of the present invention can release pre-registration resources in time and reduce waste of resources.

8 Claims, 2 Drawing Sheets

OTHER PUBLICATIONS

3 GPP TSG-RAN WG3 Meeting #60, Kansas City, Missouri, US, May 5-9, 2008, "Support of 3G HNB", pp. 1-6.

3 GPP TSG-RAN WG3, Jeju Island, Korea, Aug. 18-22, 2008, "UE Registration & Signaling Connection Establishment", p. 1-4.

3 GPP TS 25.4 V0.0.0, Sep. 2008, $3^{rd}$ Generation Partnership Project, "Technical Sepcification Group Radio Access Network; UTRAN Iuh Interface HNBAP signaling", Release x, pp. 1-24.

3 GPP TSG-RAN3 Meeting #61bis, Prague, Czechia, Sep. 30-Oct. 3, 2008, "HNBAP Specification with IEs Proposal", p. 1.

International Search Report, mailed on Nov. 5, 2009, in corresponding International Application No. PCT/CN2009/073037 (6pgs).

Office Action, mailed Jan. 31, 2012, in corresponding Chinese Application No. 200810216523.4 (29 pp.).

European Search Report issued Jul. 10, 2012 in corresponding European Patent Application No. 09817193.7 (7 pages).

$3^{rd}$ Chinese Office Action issued Jun. 18, 2012 in corresponding Chinese Patent Application No. 200810216523.4 (11 pages) (14 pages English Translation).

\* cited by examiner

DE-REGISTRATION METHOD, HOME NODEB (HNB), AND HOME NODEB GATEWAY (HNB GW)

CROSS-REFERENCE TO RELATED APPLICATIONS

This application is a continuation of International Application No. PCT/CN2009/073037, filed on Jul. 31, 2009, which claims priority to Chinese Patent Application No. 200810216523.4, filed on Sep. 26, 2008, both of which are hereby incorporated by reference in their entireties.

FIELD OF THE INVENTION

The present invention relates to the field of communication technology, and more particularly, to a de-registration method, a Home NodeB gateway (HNB GW), and a Home NodeB (HNB).

BACKGROUND OF THE INVENTION

With the rapid development of Internet services and the extensive application of broadband access networks and wireless networks, high-speed and easily accessed networks are drawing wide attention. Users need high-speed, convenient, and low-cost hand-held wireless equipments to enjoy wireless data services. Meanwhile, with the ever increasing of users of $3^{rd}$ Generation (3-G) and ever deepening study on Long Term Evolution (LTE), as a typical representative of private NodeBs, an HNB or an Access Point (AP) is drawing more and more interests. The HNB refers to a miniaturized NodeB for Home or office, and it may be completely private, or can also be open to public with different priorities or authorities that are set. It is privately owned but not owned by the government or operators, and its target uses may be a small range of users, or may be a wide range of users.

In existing technical solutions, when user equipment (UE) accesses to the HNB and is authorized by the HNB, the HNB needs to send a registration message of the UE to an HNB GW, and the HNB GW will assign and reserve corresponding Iuh Interface resources for the UE, which are known as pre-registration resources, such as UE Context ID (which identifies a signaling connection of the UE on the Iuh interface). The corresponding Iuh interface resources remain valid until the HNB finds that the UE moves out of the coverage of the HNB. After that, the HNB releases the assigned pre-registration resource for the UE, and sends a de-register message of the UE to notify the HNB GW that the HNB GW shall release the assigned pre-registration resources for the UE.

During implementing the present invention, the inventor found that the existing UE de-registration procedure is initiated only by the HNB, and if the HNB does not receive any information of the UE within a Location Area Update (LAU) period, the HNB determines that the UE has moved out of the coverage of the HNB, and needs to send a de-register request message and clear pre-registration resources.

If the LAU period is set relatively long, the HNB generally cannot detect the movement of the UE at the first time when the UE in an idle or Cell_PCH state moves to another cell, and therefore will not initiate the de-registration procedure in time. Therefore, within a very long LAU period, the pre-registration resources including the UE Context ID on the HNB and the HNB GW are reserved even though the UE has moved to another cell, resulting in waste of resources.

If the LAU period is set relatively short, a UE falling within the HNB will frequently send LAU messages to the HNB, causing waste of resources, reducing frequency utilization efficiency, and increasing the power consumption of the UE.

SUMMARY OF THE INVENTION

The primary technical problem to be solved by embodiments of the present invention is to provide a de-registration method, an HNB and an HNB GW, in order to release pre-registration resources assigned for a UE in time.

To solve the above technical problem, in an embodiment, the present invention provides a de-registration method, which includes the following steps:

An HNB GW receives indication information indicating that a UE has moved to another cell from a source HNB, and initiates release of pre-registration resources corresponding to the UE.

In an embodiment of the present invention, the present invention provides an HNB GW, which includes a transceiver and a release initiating unit.

The transceiver is configured to receive indication information that indicates a UE has moved to another cell from a source HNB and is sent by the HNB GW.

The release initiating unit is configured to initiate release of pre-registration resources corresponding to the UE after the transceiver receives the indication information.

In an embodiment of the present invention, the present invention provides an HNB, which includes a Base Station transceiver and a Base Station release initiating unit.

The Base Station transceiver is configured to receive indication information that indicates a UE has moved to another cell from a source HNB and is forwarded by an HNB GW to the HNB.

The Base Station release initiating unit is configured to initiate release of pre-registration resources corresponding to the UE after the transceiver receives the indication information.

It can be seen from the above embodiments that the HNB GW initiates release of pre-registration resources corresponding to a UE through the received indication information indicating that the UE has moved to another cell, thereby enabling the HNB GW and the HNB to know as fast as possible that the UE has moved out of the coverage of the HNB cell and release the pre-registration resources assigned for the UE in time, therefore reducing waste of resources.

DETAILED DESCRIPTION OF THE EMBODIMENTS

For better understanding the purposes, technical solutions, and advantages of the present invention, the technical solutions provided in the embodiments of the present invention are illustrated in detail below with reference to the accompanying drawings.

Figure 1:
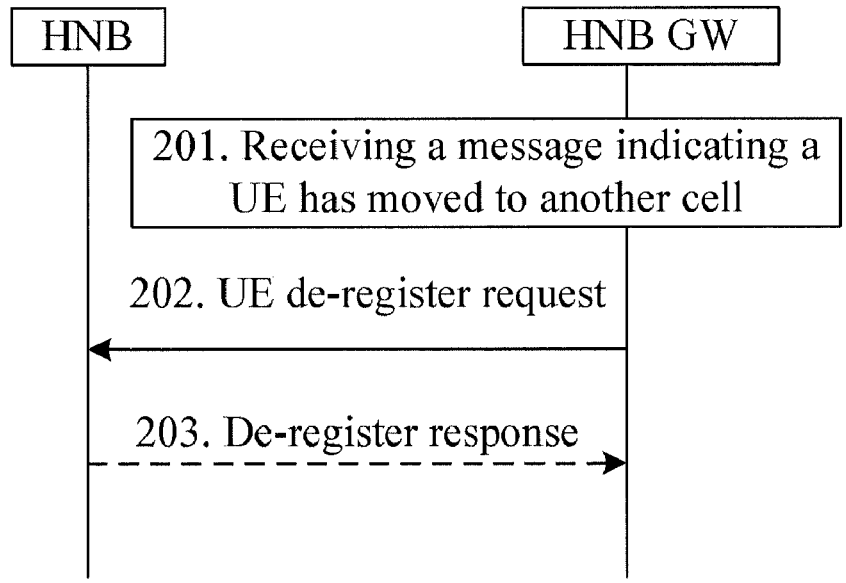
FIG. 1 is a flow chart of a de-registration method according to an embodiment of the present invention.

A de-registration method is provided in a first embodiment of the present invention. Referring to FIG. 1, the method includes the following steps:

Step 201: An HNB GW acquires a message indicating that a UE has moved to another cell.

The HNB GW can learn that the UE has moved to another cell by using the following methods.

Method 1: The UE initiates a register request to the HNB GW in another cell, and at this time, the HNB GW can know that the UE has moved out of the coverage of the HNB;

Method 2: When the HNB GW has a corresponding interface with a Radio Network Controller (RNC) of a neighboring macro network or a neighboring HNB GW, and when the UE registers with a cell controlled by the RNC of the neighboring macro network or the HNB GW, the RNC of the neighboring macro network or the neighboring HNB GW can analyze that the UE at one time camps on an HNB in the HNB GW by parsing signaling, and notify the HNB GW that the UE has moved to another cell through a message (such as a Cell update message).

Method 3: The UE will initiate an LAU procedure when the UE moves out of the coverage of the HNB, and notifies a core network of updating information about a location area where the UE locates through the LAU process so that the core network can know that the UE has moved out of original cell of the UE, and can find corresponding HNB GW according to a location area code of the original cell reported by the UE and send a notification message to the HNB GW to notify the HNB GW that the UE has moved out of the coverage of the HNB.

Step 202: The HNB GW detects whether pre-registration resources assigned by the HNB GW for the UE exist, and if the pre-registration resources exist, releases the pre-registration resources, and sends a UE de-register request to the HNB to notify the HNB that the UE has moved to another cell and releases the pre-registration resources assigned by the HNB for the UE.

Step 203: Optionally, if, in step 202, the HNB detects that no pre-registration resources exist, the HNB sends a de-register response message to the HNB GW to notify the HNB GW that the pre-registration resources have been released.

A second embodiment is similar to this embodiment, with the exception of the time of initiating the de-registration procedure.

Specifically, the HNB GW sends a UE de-register request to the HNB after a preset period of time when the HNB GW acquires the message indicating that the UE has moved to another cell, to notify the HNB that the UE has moved to another cell and release the pre-registration resources assigned for the UE.

To prevent the UE from switching back to the HNB cell again and initiating a register request of the UE from the HNB cell in a short time, that is, reconstructing registration information after releasing the registration resources in a short time, the second embodiment of the present invention sets that the HNB GW sends the de-register request to a corresponding HNB only if the HNB GW does not receive a message sent by the UE from the HNB for a period of time.

In the first and second embodiments, the HNB GW detects whether the HNB GW itself has pre-registration resources after receiving indication information indicating that the UE moves to another cell, and if the HNB GW itself has the pre-registration resources, releases the pre-registration resources and sends a de-register request message to the HNB immediately or after a preset period of time. If the HNB does not detect any pre-registration resources, the HNB sends a de-register response message to the HNB GW.

Figure 2:
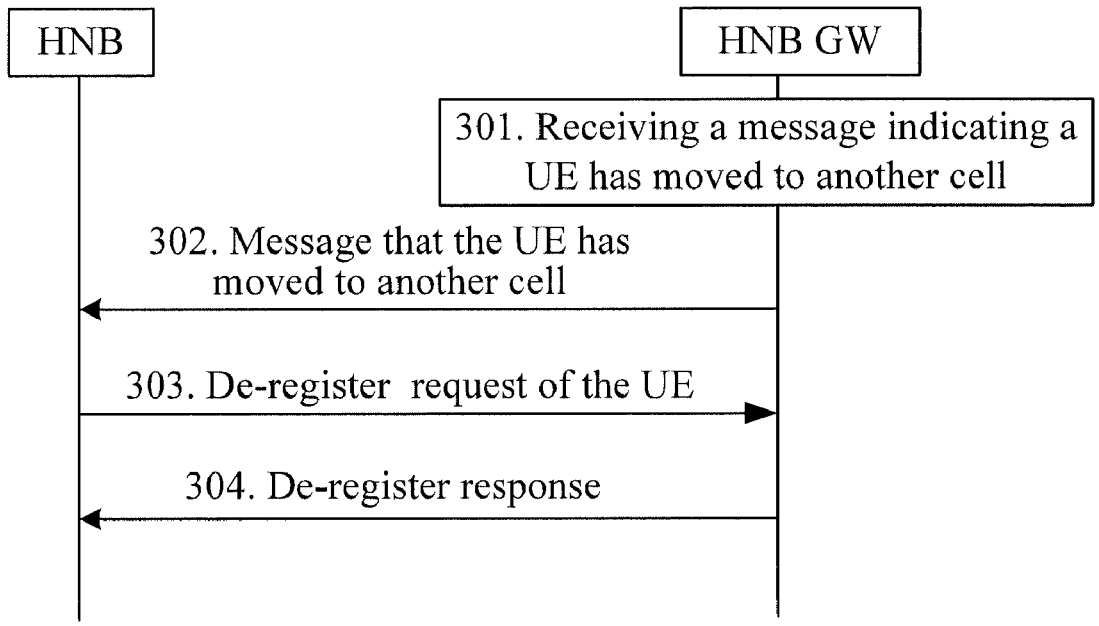
FIG. 2 is a flow chart of another de-registration method according to an embodiment of the present invention.

FIG. 2 is another de-registration method provided in an embodiment of the present invention. As shown in FIG. 2, the method includes the following steps.

Step 301: An HNB GW receives a message indicating that a UE has moved to another cell.

Step 302: The HNB GW sends information indicating that the UE has moved to another cell to an HNB.

Step 303: The HNB releases pre-registration resources assigned by the HNB for the UE if the HNB detects the pre-registration resources, and immediately sends a de-register request message to the HNB GW. However, to prevent the UE from switching back to the HNB GW cell again and initiating a register request of the UE from the HNB GW cell in a short time, i.e., reconstructing registration information after releasing the registration resources in a short time, the HNB can also send the de-register request message to the HNB GW after a period of time.

Step 304: If the HNB GW does not detect pre-registration resources assigned by the HNB for the UE at the HNB GW, the HNB GW sends a de-register response message to the HNB to notify the HNB that the pre-registration resources on the HNB GW have been released.

Figure 3:
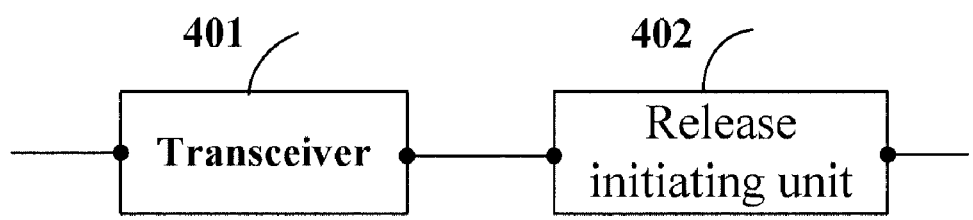
FIG. 3 is a structural diagram of an HNB GW according to an embodiment of the present invention.

FIG. 3 describes a schematic diagram of an HNB GW according to an embodiment of the present invention, which includes a transceiver 401 and a release initiating unit 402.

The transceiver 401 is configured to receive indication information that indicates a UE moves to another cell from a source HNB and is sent by the HNB GW, which includes receiving a register request initiated to the HNB GW by the UE in another cell, a Cell Update message of the UE sent by an RNC of a neighboring macro network or a neighboring HNB GW, and a message indicating that the UE moves into a macro network sent by a core network.

The transceiver may be further configured to receive a de-register response message sent by the HNB. After the HNB GW sends the de-register request message to the HNB, if the HNB does not detect the pre-registration resources of the UE, the HNB sends the de-register response message to the HNB GW to notify the HNB GW that the pre-registration resources assigned by the HNB have been released.

The transceiver is further configured to forward the indication information to the HNB, and receive a de-register request message sent by the HNB after receiving the indication information.

The release initiating unit 402 is configured to initiate release of the pre-registration resources corresponding to the UE after the transceiver receives the indication information.

When the transceiver receives the indication information and pre-registration resources corresponding to the UE exist in the HNB GW, the pre-registration resources in the HNB GW are released, and the HNB is notified of releasing the pre-registration resources corresponding to the UE by sending the de-register request message to the HNB immediately or after a preset period of time through the transceiver.

The release initiating unit is further configured to release the pre-registration resources corresponding to the UE in the HNB GW after the transceiver receives the de-register request message.

It can be seen from the above that the HNB GW determines whether the UE moves to another cell before sending the de-register request to the HNB and releases the reserved Iuh resources, thereby reducing waste of resources.

Figure 4:
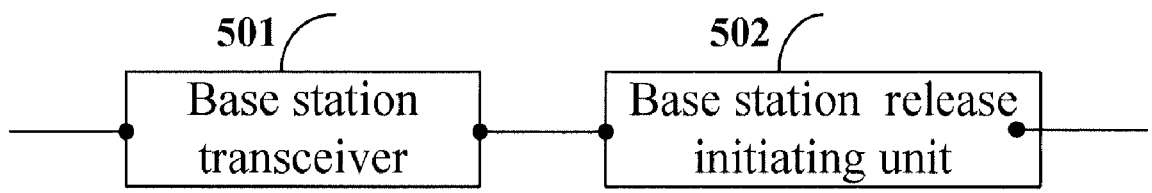
FIG. 4 is a structural diagram of an HNB according to an embodiment of the present invention.

FIG. 4 describes a schematic structural diagram of an HNB according to an embodiment of the present invention, which includes a base station transceiver 501 and a base station release initiating unit 502.

The base station transceiver 501 is configured to receive indication information which indicates that a UE moves to another cell from a source HNB and is forwarded by an HNB GW to the HNB. It includes receiving a register request initiated to the HNB GW by the UE in another cell, a Cell Update message of the UE sent by an RNC of a neighboring macro network or a neighboring HNB GW, and a message indicating that the UE moves into a macro network sent by a core network.

The Base station transceiver may further be configured to receive a de-register response message sent by the HNB GW to the HNB. After the HNB sends the de-register request message to the HNB GW, if the HNB GW itself does not detect pre-registration resources, the HNB GW sends the de-register response message to the HNB to notify the HNB that the pre-registration resources have been released.

The Base station transceiver is configured to receive a de-register request message sent by the HNB GW after receiving the indication information.

After the transceiver receives the indication information, the Base station release initiating unit 502 is configured to initiate release of the pre-registration resources corresponding to the UE.

After the Base station transceiver receives the indication information and pre-registration resources corresponding to the UE exist in the HNB, the pre-registration resources in the HNB are released, and the HNB GW is notified of releasing the pre-registration resources corresponding to the UE by sending the de-register request message to the HNB GW immediately or after a preset period of time through the transceiver.

After the Base station transceiver receives the de-register request message, the Base station release initiating unit is configured to release the pre-registration resources corresponding to the UE in the HNB.

It can be seen from the above embodiments that the HNB GW receives indication information indicating that a UE moves to another cell and initiates release of the pre-registration resources corresponding to the UE, thereby enabling the HNB GW to acquire the message indicating that the UE has moved out of the coverage of the HNB cell and release the pre-registration resources assigned for the UE in time, reducing waste of resources.

It will be clearly understood by those skilled in the art through the above description of various embodiments that, the present invention can be implemented by means of software and a necessary general hardware platform, or, of course, by means of hardware, but the former is preferred in many cases. Based on such understanding, the technical solutions of the present invention, or the portions contributing to the prior art can essentially be embodied in form of a software product. The computer software product is stored in one storage medium and includes several instructions to cause a computer device, which may be a personal computer, a server or a network device, to perform the methods described in the embodiments of the present invention.

The present invention has been illustrated and described with reference to some exemplary embodiments of the present invention, but it should be understood by those of ordinary skill in the art that various changes can be made thereto in forms and details without departing from the spirit and scope of the present invention.

What is claimed is:

1. A de-registration method, comprising:
receiving, by a gateway of a Home NodeB (HNB GW), indication information indicating that a user equipment (UE) has moved from a cell of the Home NodeB (HNB) to another cell; and
according to the indication information,
detecting, by the HNB GW, whether pre-registration resources in the HNB GW corresponding to the UE exist, and
if the pre-registration resources in the HNB GW corresponding to the UE exist, releasing the pre-registration resources in the HNB GW, and sending a de-register request to the HNB to notify the HNB to release pre-registration resources in the HNB corresponding to the UE.

2. The de-registration method of claim 1, wherein the receiving, by the HNB GW, the indication information comprises:
receiving, by the HNB GW, a register request initiated to the HNB GW by the UE in the another cell.

3. The de-registration method of claim 1, further comprising:
receiving, by the HNB GW, a de-register response message returned by the HNB,
wherein the de-register response message is a message returned to the HNB GW by the HNB, and the message is returned when the HNB receives the de-register request and does not detect the pre-registration resources in the HNB corresponding to the UE.

4. The de-registration method of claim 3, wherein the sending the de-register request message to the HNB comprises:
sending, by the HNB GW, the de-register request to the HNB after a preset period of time.

5. The de-registration method of claim 1, wherein the sending the de-register request message to the HNB comprises:
sending, by the HNB GW, the de-register request to the HNB after a preset period of time.

6. A gateway of a Home NodeB (HNB GW), comprising:
a transceiver, configured to receive indication information indicating that a user equipment (UE) has moved from a cell of the Home NodeB (HNB) to another cell; and
a release initiating unit, configured to detect according to the indication information whether pre-registration resources in the HNB GW corresponding to the UE exist, and if the pre-registration resources in the HNB GW corresponding to the UE exist, release the pre-registration resources in the HNB GW and send a de-register request to the HNB corresponding to the UE to notify the HNB to release pre-registration resources in the HNB corresponding to the UE.

7. The HNB GW of claim 6, wherein:
the transceiver is further configured to receive a register request initiated to the HNB GW by the UE in another cell.

8. A communications system, comprising:
a Home NodeB (HNB); and
a user equipment (UE) in communication with the HNB,
wherein the UE is configured to initiate a register request to a gateway of the Home NodeB (HNB GW), when the UE has moved from a cell of the HNB to another cell;
wherein the HNB is configured to release pre-registration resources in the HNB corresponding to the UE after receiving a de-register request sent from the HNB GW;
wherein the de-register request is sent from the HNB GW, when the HNB GW detects that pre-registration resources corresponding to the UE exist in the HNB GW and releases the pre-registration resources in the HNB GW, after the HNB GW receives the register request.

* * * * *